(12) United States Patent
Steensgard

(10) Patent No.: US 9,760,961 B2
(45) Date of Patent: Sep. 12, 2017

(54) SYSTEMS, METHODS, SOFTWARE, AND INTERFACES FOR FORMATTING LEGAL CITATIONS

(71) Applicant: Thomson Reuters Global Resources, Baar (CH)

(72) Inventor: David Steensgard, Burnsville, MN (US)

(73) Assignee: Thomson Reuters Global Resources Unlimited Company, Baar (CH)

( * ) Notice: Subject to any disclaimer, the term of this patent is extended or adjusted under 35 U.S.C. 154(b) by 0 days.

(21) Appl. No.: 14/857,137

(22) Filed: Sep. 17, 2015

(65) Prior Publication Data

US 2016/0005137 A1    Jan. 7, 2016

Related U.S. Application Data

(63) Continuation of application No. 11/849,918, filed on Sep. 4, 2007, now abandoned.

(51) Int. Cl.

| | | |
|---|---|---|
| *G06F 17/30* | (2006.01) | |
| *G06Q 50/18* | (2012.01) | |
| *G06Q 10/00* | (2012.01) | |
| *G09B 7/02* | (2006.01) | |
| *G06F 17/24* | (2006.01) | |

(52) U.S. Cl.
CPC ......... *G06Q 50/18* (2013.01); *G06F 17/3056* (2013.01); *G06F 17/30321* (2013.01); *G06F 17/30569* (2013.01); *G06F 17/30876* (2013.01); *G06Q 10/00* (2013.01); *G09B 7/02* (2013.01); *G06F 17/248* (2013.01)

(58) Field of Classification Search
CPC ......... G06F 17/30728; G06F 17/30011; G06F 17/211; G06F 17/248; G06F 17/3056
See application file for complete search history.

(56) References Cited

U.S. PATENT DOCUMENTS

| | | | |
|---|---|---|---|
| 5,794,236 A | 8/1998 | Mehrle | |
| 5,870,770 A * | 2/1999 | Wolfe | G06F 17/30728 707/E17.008 |

(Continued)

FOREIGN PATENT DOCUMENTS

| | | |
|---|---|---|
| AU | 2007290358 B2 | 10/2012 |
| CA | 2 662 179 A1 | 3/2008 |

(Continued)

OTHER PUBLICATIONS

International Application Serial No. PCT/US2007/019260, International Search Report and Written Opinion, mailed Sep. 18, 2008, 8 pgs.

(Continued)

*Primary Examiner* — Apu Mofiz
*Assistant Examiner* — Sheryl Holland

(57) ABSTRACT

The present disclosure is directed towards a citation formatting system and a method for operating an online research service for providing legal citations. The exemplary system provides the citation formatting function in a client-server architecture, receiving citations from a user's client access device over a computer network and communicating citation format suggestions back to the client access device for possible insertion into a document on the access device.

16 Claims, 9 Drawing Sheets

(56) References Cited

U.S. PATENT DOCUMENTS

| | | | |
|---|---|---|---|
| 6,078,914 A * | 6/2000 | Redfern | G06F 17/30663 |
| 6,263,351 B1 | 7/2001 | Wolfe | |
| 6,289,342 B1 | 9/2001 | Lawrence et al. | |
| 6,295,542 B1 | 9/2001 | Corbin | |
| 6,457,028 B1 | 9/2002 | Pitkow et al. | |
| 6,529,911 B1 | 3/2003 | Mielenhausen | |
| 6,668,255 B2 * | 12/2003 | Mielenhausen | G06Q 99/00 |
| | | | 707/736 |
| 6,738,780 B2 | 5/2004 | Lawrence et al. | |
| 6,856,988 B1 | 2/2005 | Humphrey et al. | |
| 7,003,719 B1 * | 2/2006 | Rosenoff | G06F 17/30014 |
| | | | 704/4 |
| 7,028,259 B1 * | 4/2006 | Jacobson | G06F 17/278 |
| | | | 715/236 |
| 7,085,755 B2 * | 8/2006 | Bluhm | G06F 17/30011 |
| 7,246,310 B1 * | 7/2007 | Wolfe | G06F 17/30716 |
| | | | 358/1.15 |
| 7,529,756 B1 | 5/2009 | Haschart et al. | |
| 7,818,668 B2 | 10/2010 | Michelstein et al. | |
| 8,639,694 B1 * | 1/2014 | Wolfe | G06F 17/30306 |
| | | | 707/706 |
| 9,122,666 B2 * | 9/2015 | Kerry-Tyerman | |
| 2002/0156760 A1 * | 10/2002 | Lawrence | G06F 17/30728 |
| 2003/0046307 A1 | 3/2003 | Rivette et al. | |
| 2005/0022114 A1 * | 1/2005 | Shanahan | G06F 21/10 |
| | | | 715/234 |
| 2005/0149343 A1 * | 7/2005 | Rhoads | G06Q 10/10 |
| | | | 705/311 |
| 2006/0041608 A1 * | 2/2006 | Miller | G06F 17/30722 |
| 2006/0047656 A1 | 3/2006 | Dehlinger et al. | |
| 2006/0090066 A1 | 4/2006 | Maze et al. | |
| 2006/0112084 A1 * | 5/2006 | McBeath | G06F 17/30646 |
| 2006/0149720 A1 * | 7/2006 | Dehlinger | G06F 17/30616 |
| 2006/0195430 A1 | 8/2006 | Arumainayagam et al. | |
| 2006/0218492 A1 * | 9/2006 | Andrade | G06F 17/24 |
| | | | 715/234 |
| 2006/0218499 A1 * | 9/2006 | Matthews | G06F 17/30616 |
| | | | 715/765 |
| 2006/0248440 A1 | 11/2006 | Rhoads et al. | |
| 2006/0287971 A1 | 12/2006 | Armstrong | |
| 2007/0172062 A1 * | 7/2007 | Waldo | G06F 17/2725 |
| | | | 380/252 |
| 2007/0255686 A1 * | 11/2007 | Kemp | G06F 17/30728 |
| 2008/0052619 A1 | 2/2008 | Illg | |

FOREIGN PATENT DOCUMENTS

| | | |
|---|---|---|
| EP | 2 062 126 A2 | 5/2009 |
| NZ | 575931 A | 7/2012 |
| WO | WO2008027583 A2 | 3/2008 |
| WO | WO2008027583 A3 | 3/2008 |

OTHER PUBLICATIONS

Bellia, P.L., et al., "Problems of Policy and Jurisprudence in the Information Age", Supplement to Cyberlaw, retrieved on Sep. 15, 2009, retrieved from the Internet: <URL:http://www.informationtechnologylaw.com/cyber/spring2004/supp2003.pdf> (Jul. 15, 2003), 76 pgs.

J.A. Long, J.D., Legal Research Using Westlaw, 2001, Delmar, pp. 3, 10, 11, 35, 48, 69, 72, and 73.

Canadian Office Action dated Sep. 2, 2015, in corresponding Canadian Application No. 2,662,179, 4 pages.

PCT International Premliminary Report of Patentability dated Mar. 3, 2009, for corresponding PCT Application No, PCT/US2007/019260, 5 pages.

Canadian Office Action dated Aug. 13, 2014, for corresponding Canadian Application No. 2,662,179, 4 pages.

Canadian Office Action Response dated Feb. 11, 2015, in corresponding Canadian Application No. 2,662,179, 51 pages.

Canadian Office Action Response dated Feb. 24, 2016, in corresponding Canadian Application No. 2,662,179, 54 pages.

Canadian Office Action dated Jun. 22, 2016, for corresponding Canadian Application No. 2,662,179, 5 pages.

Canadian Office Action Response dated Oct. 31, 2016, in corresponding Canadian Application No. 2,662,179, 41 pages.

Notice of Acceptance dated Jun. 19, 2012, in corresponding Australian Patent Application No. 2007290358, 1 page.

EP Written Submissions dated Sep. 13, 2016, in corresponding EP Application No. 07837665.4, 18 pages.

EP Summons to attend oral proceeding dated Mar. 2, 2016 in corresponding EP Application No. 07837665.4, 11 pages.

EP Office Action Response dated Aug. 26, 2014 in corresponding EP Application No. 07837665.4, 7 pages.

EP Office Action dated Feb. 17, 2014 in corresponding EP Application No. 07837665.4, 5 pages.

EP Office Action Response dated Mar. 21, 2011 in corresponding EP Application No. 07837665.4, 13 pages.

Extended search report received dated Aug. 23, 2010 in corresponding EP Application No. 07837665.4, 5 pages.

Canadian Office Action dated Mar. 6, 2017, in corresponding Canadian Application No. 2,662,179, 5 pages.

First Examination Report received dated May 12, 2011, in corresponding Australian Application No. 2007290358, 2 pages.

Australian Examination Report Response dated Jun. 12, 2012, in corresponding Australian Application 2007290358, 22 pages.

Decision to refuse a European Patent Application dated Mar. 8, 2017, in corresponding EP Application No. 37837665.4, pages 24.

Request to Withdraw Oral Proceedings dated Nov. 9, 2016, in corresponding EP Application No. 07837665.4, pages 3.

Canadian Office Action dated Sep. 2, 2015, in corresponding Canadian Application No. 2,662,179.

PCT International Premliminary Report of Patentability dated Mar. 3, 2009, for corresponding PCT Application No. PCT/US2007/019260.

Canadian Office Action dated Aug. 13, 2014, for corresponding Canadian Application No. 2,662,179.

Canadian Office Action Response dated Feb. 11, 2015, in corresponding Canadian Application No. 2,662,179.

Canadian Office Action Response dated Feb. 24, 2016, in corresponding Canadian Application No. 2,662,179.

Canadian Office Action dated Jun. 22, 2016, for corresponding Canadian Application No. 2,662,179.

Canadian Office Action Response dated Oct. 31, 2016, in corresponding Canadian Application No. 2,662,179.

EP Oral Procceding dated Feb. 3, 2016, in corresponding EP Application No. 07837665.4.

EP Written Summons dated Sep. 13, 2016, in corresponding EP Application No. 07837665.4.

EP Summons to attend oral proceeding dated Mar. 2, 2016 in corresponding EP Application No. 07837665.4.

EP Office Action Response dated Aug. 27, 2014 in corresponding EP Application No. 07837665.4.

EP Office Action dated Feb. 17, 2014 in corresponding EP Application No. 07837665.4.

EP Office Action Response dated Mar. 21, 2011 in corresponding EP Application No. 07837665.4.

* cited by examiner

FIGURE 4  Citation Format Suggestion Dialog

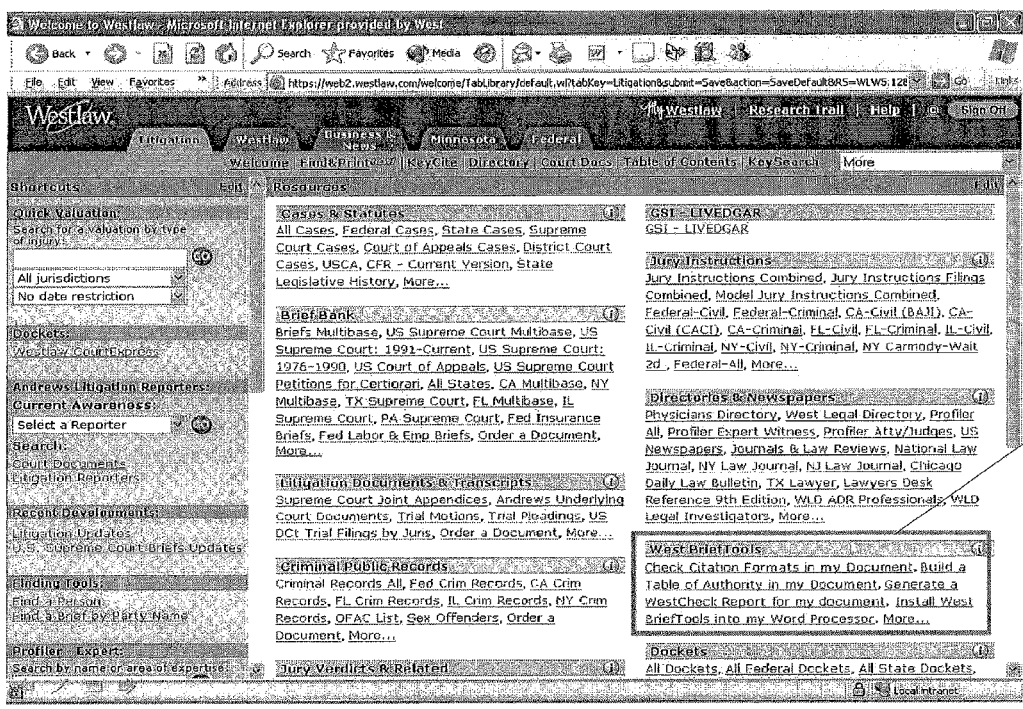
FIGURE 6: Westlaw Access via Link in Litigation Tab

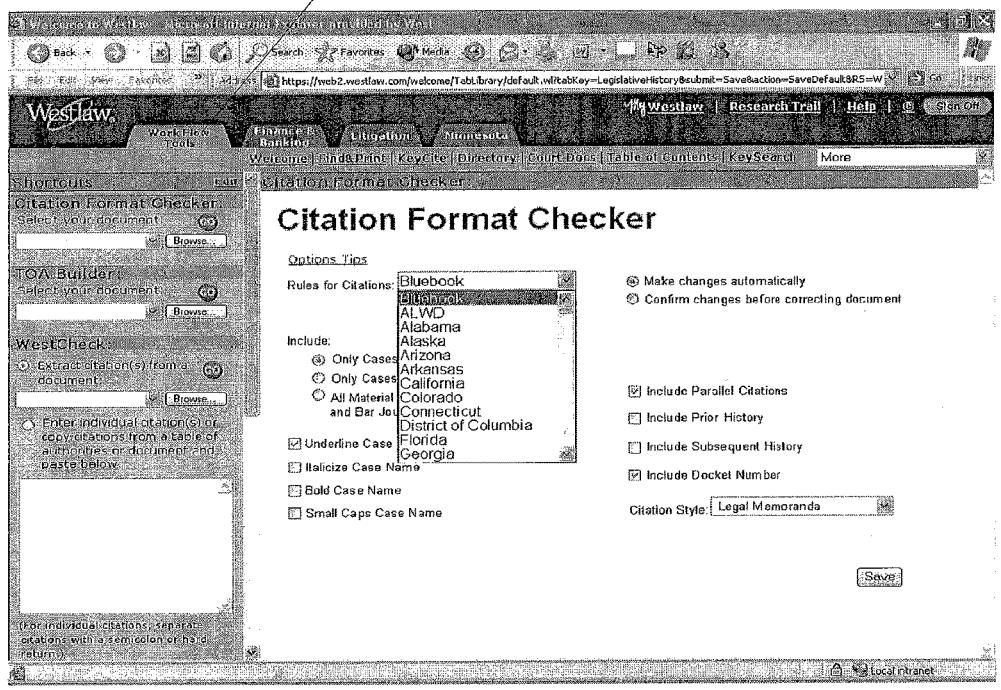
FIGURE 7 Westlaw Access via Work Flow Tools Tab

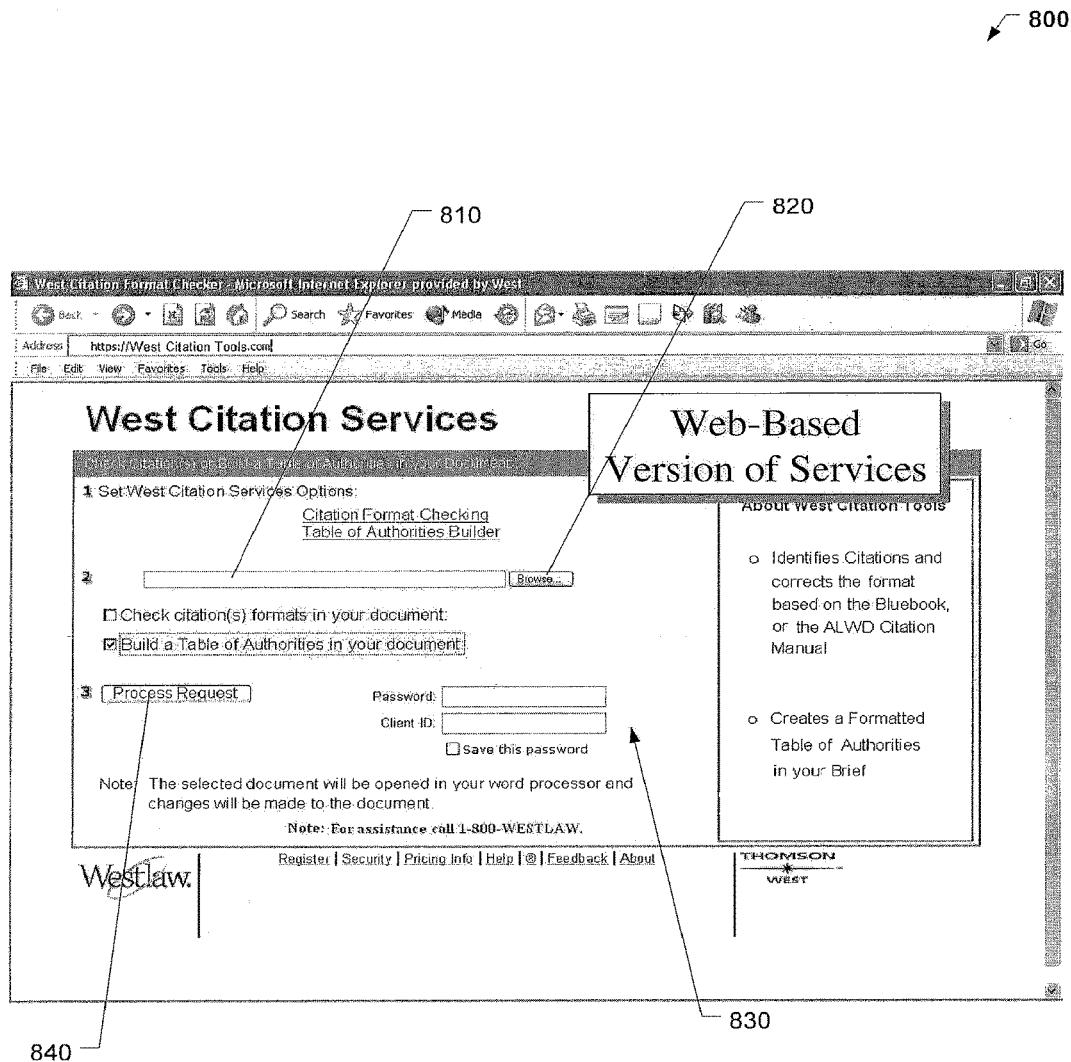
FIGURE 8  Direct Web Access To Citation Tools Function

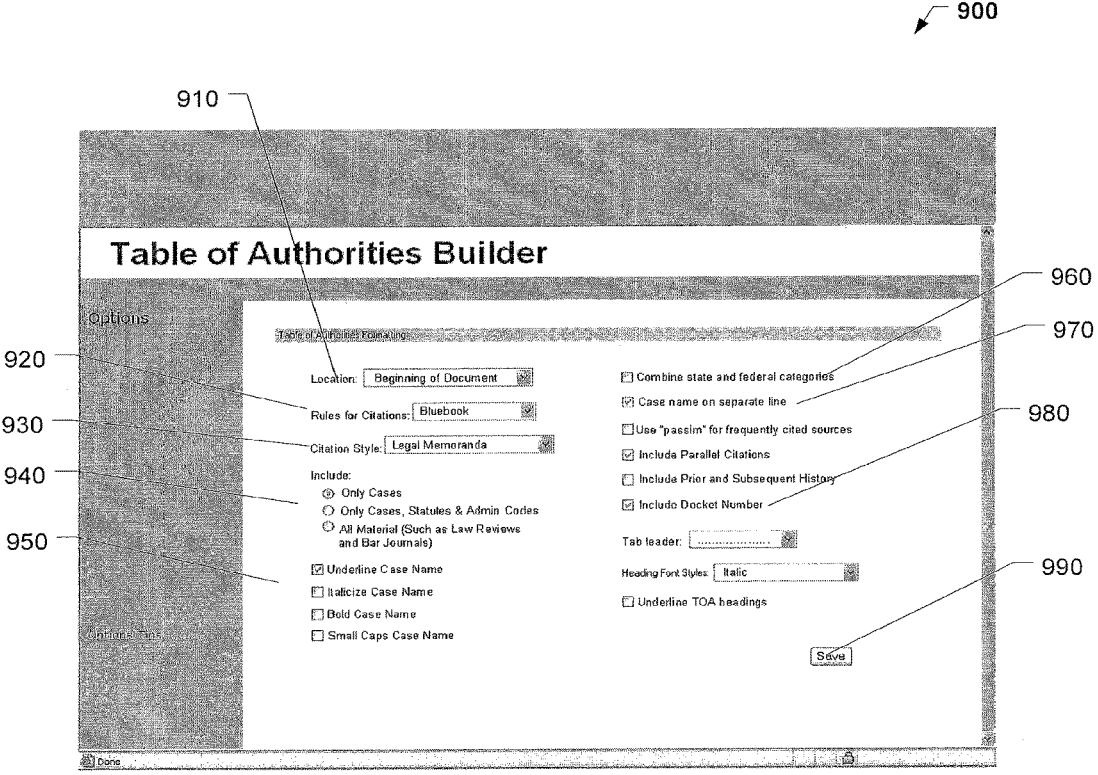
FIGURE 9 Table of Authorities Builder Interface

SYSTEMS, METHODS, SOFTWARE, AND INTERFACES FOR FORMATTING LEGAL CITATIONS

CROSS-REFERENCE TO RELATED APPLICATIONS

This application is a continuation of U.S. patent application Ser. No. 11/849,918, filed on Sep. 4, 2007, which claims priority to and benefit of U.S. Provisional Application 60/842,058, which was filed on Sep. 1, 2006, each of which is incorporated herein by reference in its entirety.

COPYRIGHT NOTICE AND PERMISSION

One or more portions of this patent document contain material subject to copyright protection. The copyright owner has no objection to the facsimile reproduction by anyone of the patent document or the patent disclosure, as it appears in the Patent and Trademark Office patent files or records, but otherwise reserves all copyrights whatsoever. The following notice applies to this document: Copyright ©2005, Thomson Global Resources.

FIELD OF THE INVENTION

Various embodiments of the present invention concern document-processing applications, particularly those tailored to assist in the authoring and production of legal documents.

BACKGROUND

The American legal system relies heavily on both written laws (statutes) and judicial opinions that apply these laws to resolve particular legal disputes. In resolving these disputes, lawyers arguing for their clients produce written documents, such as motions, briefs, and so forth arguing for their clients. These written documents commonly cite, or reference, relevant opinions, statutes, and scholarly articles, collectively known as legal authority, supporting the arguments they make.

The courts that receive these documents generally require that the legal authority be cited using very specific formatting rules or citation standards. One common set of citation standards is A Uniform of System of Citation, widely known as the Bluebook. Many U.S. law schools have now standardized on the ALWD Citation Manual, published by Aspen Law & Business. The complexity of the rules is fairly high and it is generally a time-consuming task not only to initially format the cites according to the standards, but also to verify compliance with the standards during proofing of the document prior to filing with a court. Moreover, various courts or jurisdictions have their own specific rules, which means that lawyers frequently need to be familiar with more than one set.

In recent years, computer tools have emerged to save some time in the citation process. For example, a software application, called "Shepard's StyleCheck™" marketed by Reed Elsevier plc, checks word processing documents for Bluebook stylistic errors. The program, which operates as a separate stand-alone application on a desktop or laptop computer, receives a word-processing document as input and automatically generates a written report that lists potential errors in the citation formats found in the document. Users manually review the report and edit the legal document to correct any citation errors. Another stand-alone program, "CiteIt™" by Sidebar Software, Inc., allows users to capture excerpts of case law during online research into a notes file and stores these excerpts in combination with various full and short citation formats. A user can then select the excerpts and the appropriate citation form for insertion into a word-processing document.

SUMMARY

In order to address this and/or other needs, the present inventor devised, among other things, a citation formatting system, method, and software. The exemplary system includes a citation finder module and a cite formatter module. The finder module "plugs into" a document-processing application, such as a word processor and finds one or more citations within an active document, and sends them via a network communications link, such an the Internet, to the citation formatter. The citation formatter receives the found citations, formats them according to a selected citation format, and returns the formatted citations to the document-processing application for selective insertion into the document.

BRIEF DESCRIPTION OF THE DRAWINGS

FIG. 6 is a facsimile of a graphical user interface 600 which may be incorporated into system 100 and which corresponds to one or more embodiments of the invention.

FIG. 7 is a facsimile of a graphical user interface 700 which may be incorporated into system 100 and which corresponds to one or more embodiments of the invention.

FIG. 8 is a facsimile of a graphical user interface 800 which may be incorporated into system 100 and which corresponds to one or more embodiments of the invention.

FIG. 9 is a facsimile of a graphical user interface 900 which may be incorporated into system 100 and which corresponds to one or more embodiments of the invention.

DETAILED DESCRIPTION

This description, which references and incorporates the above-identified Figures, describes one or more specific embodiments of an invention. These embodiments, offered not to limit but only to exemplify and teach the invention, are shown and described in sufficient detail to enable those skilled in the art to implement or practice the invention. Thus, where appropriate to avoid obscuring the invention, the description may omit certain information known to those of skill in the art.

Exemplary Document-Processing and Information-Retrieval System

Figure 1:
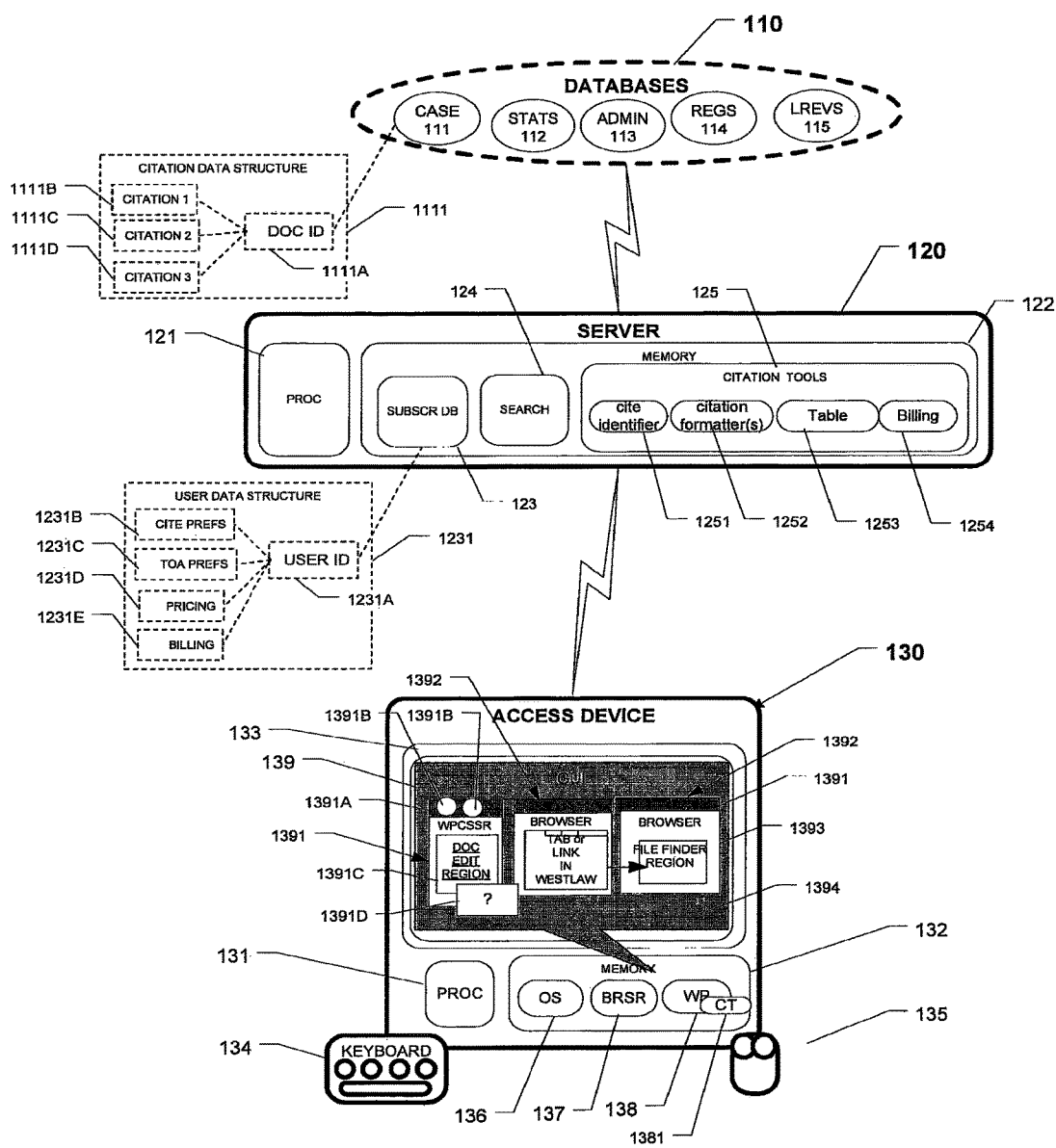
FIG. 1 is a block diagram of an exemplary online document processing and information-retrieval system 100 corresponding to one or more embodiments of the present invention.

FIG. 1 shows an exemplary document-processing and information-retrieval system 100, which may be adapted to incorporate the capabilities or functions described above. System 100 includes one or more databases 110, one or more servers 120, and one or more access devices 130.

Exemplary Databases

Databases 110 includes a set of legal research databases. In the exemplary embodiment, these include a caselaw database 111, a statutes databases 112, an administrative reports and decisions database 113, a regulations database 114, and a law review and periodicals database 115. Caselaw database 111 includes judicial opinion documents from one or more local, state, federal, and/or international jurisdictions. Statutes database 112 includes statute documents, including legislative history, from one or more local, state, federal, and/or international jurisdictions. Administrative reports and decisions database 113 includes administrative reports and decisions from one or more local, state, federal, and/or international administrative agencies. Regulations database 114 includes administrative regulations, rules, or codes for one or more local, state, federal, and/or international administrative agencies. And, the law review and periodicals database 115 includes law review and other legal periodical documents.

Additionally, each of the documents within database 110 is associated with an indexed citation data structure, of which a citation data structure 1111 is generally representative. Citation data structure 1111 includes a document identifier 1111A, which is logically associated with a first citation 1111B, a second citation 1111C, and a third citation 1111D. Document identifier 1111A uniquely identifies its corresponding document within a universe of documents. First citation 1111B represents one or more citations of the corresponding document according to a first citation standard, such as the Bluebook. Second citation 1111C represents one or more citation of the corresponding document according a second citation standard such as ALWD, and third citation represents one or more citations of the corresponding document according a third citation standard. In some embodiments, the citations for the corresponding data includes parallel citations and/or normalized citations that are readily convertible to any other citation format. Some embodiments include fewer or greater numbers of citation data sets. Also, in some embodiments, each of documents is associated with one or more status indicators indicating whether the document itself or one or more cases within the document has a compromised legal authority. In some embodiments, the documents are also associated with historically related legal cases.

Databases 110, which take the exemplary form of one or more electronic, magnetic, or optical data-storage devices, include or are otherwise associated with respective indices (not shown). Each of the indices includes terms and phrases in association with corresponding document addresses, identifiers, and other conventional information. Databases 110 are coupled or couplable via a wireless or wireline communications network, such as a local-, wide-, private-, or virtual-private network, to server 120.

Exemplary Server

Server 120, which is generally representative of one or more servers for serving data in the form of webpages or other markup language forms with associated applets, ActiveX controls, remote-invocation objects, or other related software and data structures to service clients of various "thicknesses." More particularly, server 120 includes a processor module 121, a memory module 122, a subscriber database 123, a search module 124, and a citation-tools module 125.

Processor module 121 includes one or more local or distributed processors, controllers, or virtual machines. In the exemplary embodiment, processor module 121 assumes any convenient or desirable form.

Memory module 122, which takes the exemplary form of one or more electronic, magnetic, or optical data-storage devices, stores subscriber database 123, search module 124, secondary search module 125, and information-integration-tools module 126. (Also, in some embodiments, one or more citation data structures resembling data structure 1111 may be stored in memory 122.)

Subscriber database 123 includes subscriber-related data for controlling, administering, and managing pay-as-you-go or subscription-based access of databases 110. In the exemplary embodiment, subscriber database 123 includes one or more preference data structures, of which data structure 1231 is representative. Data structure 1221 includes a customer or user identifier portion 1231A, which is logically associated with one or more operational, configuration, or usage preferences or related data for citation-tools module 125, such as preferences 1231B, 1231C, and 1231D.

Preferences 1231B includes one or more default values governing whether citation-tools module 125 (described below) is accessible by the associated user or customer and/or one or more citation format preferences, such as the Bluebook or ALWD standards. Preferences 1231C include one or more default values governing one or more table-of-authority formatting preferences for the associated user or customer. For example, the exemplary embodiment includes user preferences for use of one- or two-line table formats or use of italics and pin-point pagination information. Pricing preferences 1231D includes default values governing one or more other aspects of pricing for usage of citation-tools module 125, such as a whether pricing is per cite or per document, and what the per-cite or per-document price is. (In the absence of a temporary user override, for example, an override during a particular query or session, the default value governs.) In some embodiments, preference data may be stored locally on a user's access device in a local copy of one or more information-integration tools.

Search module 124 includes one or more search engines and related user-interface components, for receiving and processing user queries against one or more of databases 110. In the exemplary embodiment, one or more search engines associated with search module 124 provide Boolean, tf-idf, natural-language search capabilities.

Citation-tools module 125 includes coded machine readable and/or executable instruction sets for wholly or partly defining software and related user interfaces having one or more portions thereof that integrate or cooperate with one or more document-processing applications. Exemplary document-processing (or document-authoring or -editing) applications include word-processing applications, such as Microsoft Word and Corel WordPerfect applications. In addition to integration into a document-processing application, the exemplary citation-tools module also supports access to its functionality via a direct web interface or through a tab or link in an online-legal-research service, such as the Westlaw system.

More particularly, module 125 includes a cite-identifier module 1251, a citation formatting module 1252, a table-of-authority module 1253, and a billing module 1254.

Cite-identifier module 1251 includes coded instructions for, among other things, parsing documents and identifying one or more cites and portions thereof within the document and communicating the cites or portions thereof individually or in a batch to citation formatter 1252. In the exemplary embodiment, the cite-identifier module includes document-processing integrating structures for allowing the cite-identifier to integrate or plug-in to a document-processing application, such as word-processing application, hosted by an access device, such as access device 130.

Citation-formatting module 1252 includes coded machine-readable and/or executable instructions for, among other things, retrieving citation data from documents corresponding to one or more set of cite data received from cite-identifier module 1251, which as noted may be communicated from an access device or from a copy of a document stored on the server. In some embodiments, citation-formatting module 1252 includes one or more conversion programs (instruction sets) or tables that are used to convert the citation data from a given format, such as stored in association with a corresponding document in database 110, into one or more other formats contingent on the user selected citation standard. Those formats will include The Bluebook, A Uniform System of Citation (Bluebook), the ALWD Citation Manual, A Professional System of Citation (ALWD) and the formats required by all local Jurisdictions (States and Territories). Exemplary state jurisdictions include California, New York, Illinois, Texas and Florida.

Table-of-authorities module 1253 includes coded machine-readable and/or executable instructions for processing a document having citations and building a table of authorities according stored user preferences or session-specific user selections and inserting the table into a document on the server or within a document on an access device, such as access device 130. Exemplary formatting aspects which are controllable include format of party names and titles, use of Italics and underlining, removal of pinpoint page references from table entries.

Billing module 1254 includes coded machine-readable and/or executable instructions for updating billing data 1231 in subscriber database 123 (or other separate billing system) based on pricing data 1231D associated with a user. To support the pricing or billing model, the billing module also tracks and records usage statistics in the billing data, such as time and date of usage, number of documents, filenames of documents, number of citations processed, and so forth.

Exemplary Access Device

Access device 130 is generally representative of one or more access devices. In the exemplary embodiment, access device 130 takes the form of a personal computer, workstation, personal digital assistant, mobile telephone, or any other device capable of providing an effective user interface with a server or database. Specifically, access device 130 includes a processor module 131 one or more processors (or processing circuits) 131, a memory 132, a display 133, a keyboard 134, and a graphical pointer or selector 135.

Processor module 131 includes one or more processors, processing circuits, or controllers. In the exemplary embodiment, processor module 131 takes any convenient or desirable form. Coupled to processor module 131 is memory 132.

Memory 132 stores code (machine-readable or executable instructions) for an operating system 136, a browser 137, document-processing software 138. In the exemplary embodiment, operating system 136 takes the form of a version of the Microsoft Windows operating system, and browser 137 takes the form of a version of Microsoft Internet Explorer. Operating system 136 and browser 137 not only receive inputs from keyboard 134 and selector 135, but also support rendering of graphical user interfaces on display 133. In the exemplary embodiment, document processing software 138 includes Microsoft Word or Corel WordPerfect word-processing software. Document processing software is shown integrated with one or more portions 1381 of citation-tools modules 125, which are downloaded from server 120 via a wired or wireless communication link. In one embodiment, launching of document-processing software 138 or launching and pointing of browser 137 results in defining in memory and rendering one or more portions of graphical-user interface 139 on display 133.

Graphical user interface 139 presents data in association with one or more interactive control features (or user-interface elements). In the exemplary embodiment, each of these control features takes the form of a hyperlink or other browser-compatible command input. In the exemplary embodiment, interface 139 includes a word-processing application interface region 1391, an online legal-research interface region 1392, and a browser interface region 1393, which provide three access points for the functionality of citation-tools module 125 as further described below. Although FIG. 1 shows regions 1391-1393 as being simultaneously displayed, some embodiments present them at separate times.

More particularly, word-processing application interface region 1391 includes document-processing tool bar region 1391A, a citation and/or table-of-authorities function control element 1391B, a document edit region 1391C, and an option and prompt region 1391D.

Exemplary Method(s) of Operation

Figure 2:
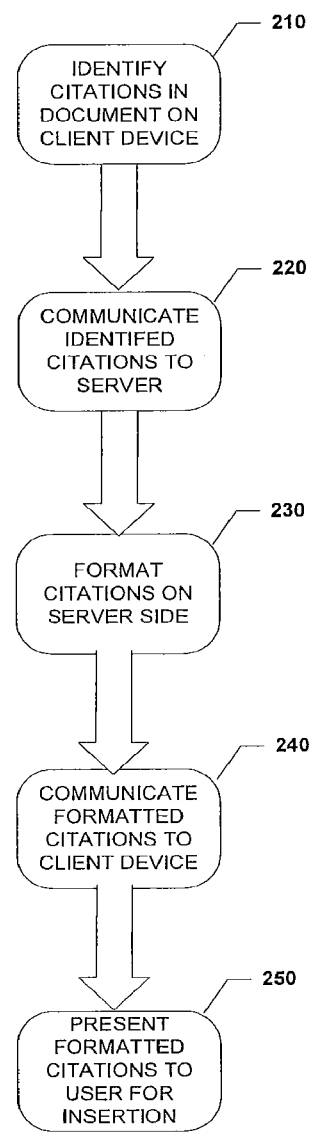
FIG. 2 is a flow chart of an exemplary method of operating system 100 and thus corresponds to one or more embodiments of the present invention.

FIG. 2 shows a flow chart 200 of one or more exemplary methods of operating a system, such as system 100. Flow chart 200 includes blocks 210-250, which are arranged and described in a serial execution sequence in the exemplary embodiment. However, other embodiments execute two or more blocks in parallel using multiple processors or processor-like devices or a single processor organized as two or more virtual machines or sub processors. Other embodiments also alter the process sequence or provide different functional partitions to achieve analogous results. For example, some embodiments may alter the client-server allocation of functions, such that functions shown and described on the server side are implemented in whole or in part on the client side, and vice versa. Moreover, still other embodiments implement the blocks as two or more interconnected hardware modules with related control and data signals communicated between and through the modules. Thus, the exemplary process flow applies to software, hardware, and firmware implementations.

Block 210 entails identifying one or more citations in a document. In one word-processing-oriented embodiment, this entails a user directing a browser in a client access device, such as access device 130, to internet-protocol (IP) address for an online information-retrieval (legal research) system, such as the Westlaw system, and then logging onto the system using a username and/or password. Successful login results in a web-based interface being output from server 120, stored in memory 132, and displayed by client access device 130.

Figure 3:
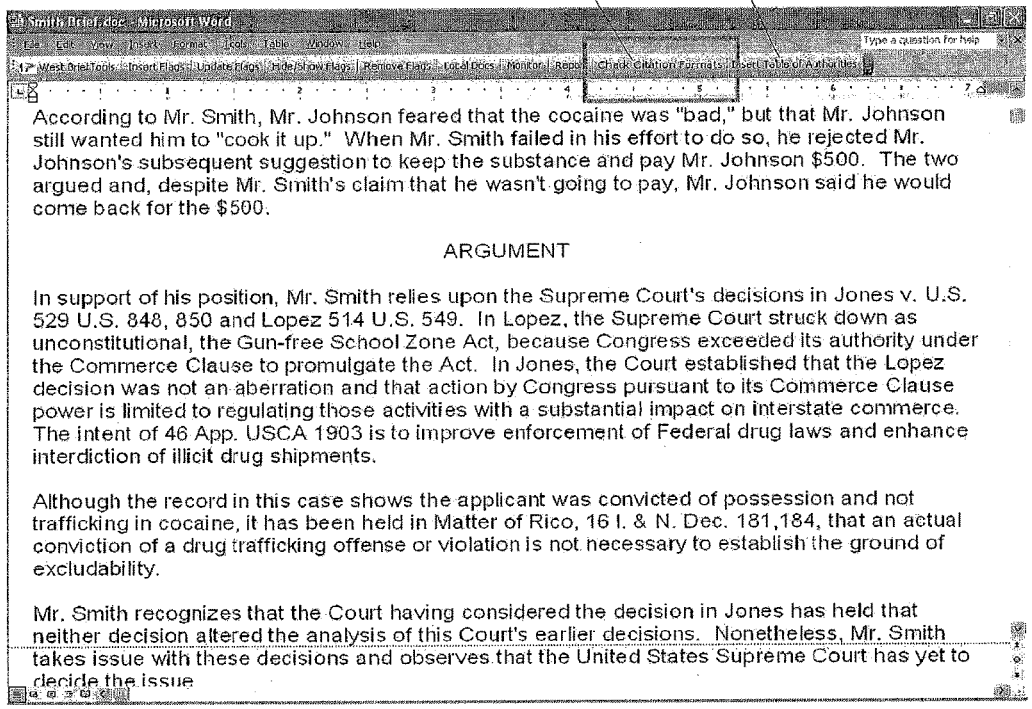
FIG. 3 is a facsimile of a graphical user interface 300 which may be incorporated into system 100 and which corresponds to one or more embodiments of the invention.

The interface includes an option for initiating download and installation of one or portions of citation-tools module 125 with corresponding toolbar plug-ins for a word-processing application. Next, this embodiment entails the user launching the word-processing application and creating or opening a document containing one or more legal citations within a document editing window or region of the word-processing application, as shown for example in interface 1391 in FIG. 1. Interface 1391 includes a tool-bar button 1391B for launching or initiating a check citations function and a tool-bar button 1391C for launching or initiating a table of authorities building function. FIG. 3 shows a facsimile of another interface 300, which also includes similarly numbered buttons 3391B and 3391C.

At this point, selection or activation of the check citations function causes a processor within client access device 130 to perform according to a locally stored version of citation identification module 1251 and thereby parse and identify one or more citations within the document editing window. In the exemplary embodiment, this identification entails identifying the beginning and end points of each of the one or more citations and the text between these beginning and end points. Execution then continues at block 220.

Block 220 entails communicating one or more of the identified legal citations to server 120. In the exemplary embodiment, this entails communicating the one or more legal citations over an Internet or other type of wired or wireless network connection to server 120.

Block 230 entails formatting the identified legal citations according to one or more selected citation standards. In the exemplary embodiment, this formatting is performed based on a predefined user preference stored in association with user data for an online legal research system. However, in other embodiments, the citation standards are defined on a session-specific basis at the time of service request via an interface, described below relative to FIG. 5.

The specific processing performed by the server—or more precisely citation formatting module 1252 in FIG. 1. After the server processes the citation text string, it returns a formatted version of the citation to the word processing program, which presents the user an option to replace the original citation with the formatted version.

More particularly, citation text is parsed into constituent components such as volume, reporter, page, etc. and the components are passed to a case control system or component within or without citations-tools module 125 to determine if there is a match to an existing case, statute, regulation, administrative decision, or article exists. In some embodiments, the citation (or normalized version thereof) is classified to one of these types of documents prior to seeking a match. If a match is found, citation data stored in or otherwise associated with the matching case data is obtained and formatted according to the desired case citation standard using specific conversion tables. In some embodiments, the citation data associated with the case is preformatted according one or more citation standards, meaning that one can automatically selected without additional processing once a matching case is identified.

If a citation cannot be matched to a existing document, an error message may be displayed indicating that no corresponding citation could be found using the supplied data. Absence of a corresponding citation may be due to an error in the citation as originally presented in the user's document, or to a lag in adding the cited document to database 110. Some embodiments may request and use additional information from the user's document, for example, subject matter or concept data or co-occurrence statistics with other citations, to determine a set of one or more candidate citations if the citation dates for example suggest that failure to match is not a database update problem, but rather an error in the citation itself. Execution proceeds to block 240.

Block 240 entails communicating one or more of the formatted citations from server 120 to access device 130. In the exemplary embodiment, this entails server 120 communicating the one or more formatted citations to the word processing application via the client-side portion 1381 of citation-tools module 1381.

Figure 4:
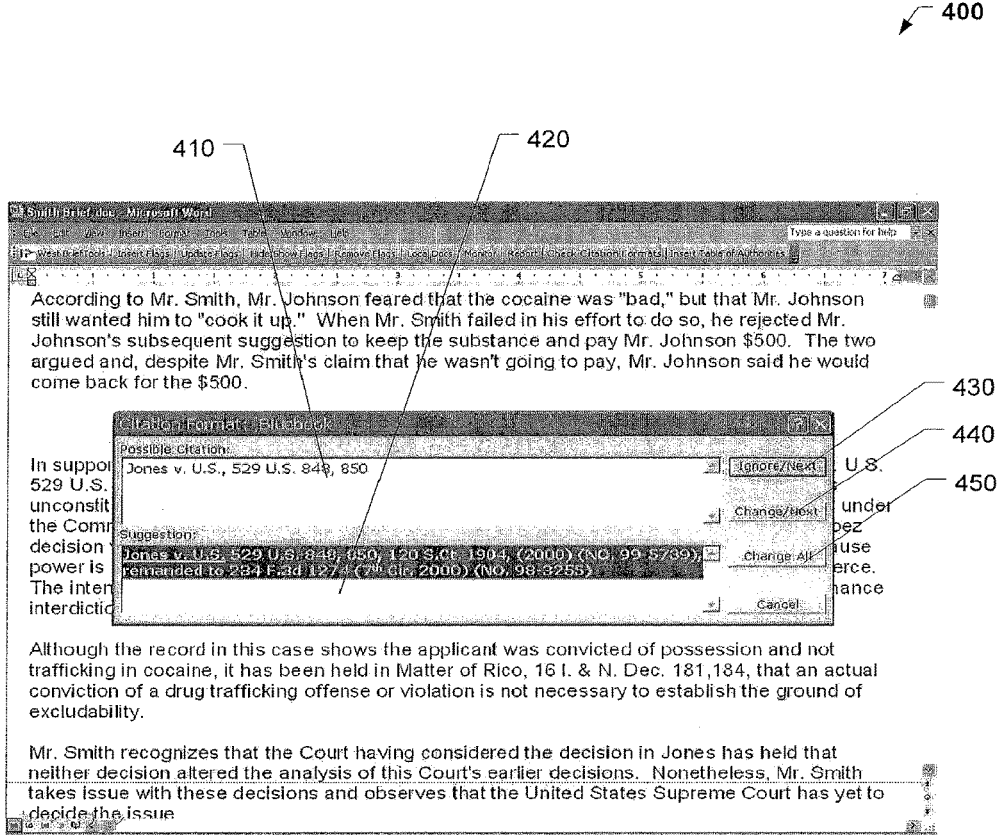
FIG. 4 is a facsimile of a graphical user interface 400 which may be incorporated into system 100 and which corresponds to one or more embodiments of the invention.

Block 250 entails presenting the one or more formatted citations to the user. In the exemplary embodiment, this presentation entails presenting a citation format suggestion dialog box to the user, with the dialog box including a display of the original extracted citation and the corresponding formatted citation provided by server 120. FIG. 4 shows an exemplary version of such an interface 400, which can be substituted for that interface 1391 in FIG. 1.

Interface 400 includes an original citation display region 410, a suggested formatted citation region 420, an ignore-next command feature 430, a change-next command feature 440, and a change-all command feature 450. Original citation display region 410 displays the text of the original found citation and suggested formatted citation region 420 displays the text of the server-provided suggestion citation format, based on the selected or preferred citation standard, in this case the Bluebook format.

Ignore-next command feature 430 enables a user to reject the suggested citation format and simultaneously automatically command the system to display the next found cite in the document and its suggested formatted version within respective regions 410 and 420. Change-next command feature 440 similarly allows the user to accept the suggested citation, which causes replacement of the original citation text with the suggested citation, while advancing display to the next original citation and suggested citation pair. Change-all command feature 450 causes automatic replacement of all found citations with their suggested replacements citations.

Figure 5:
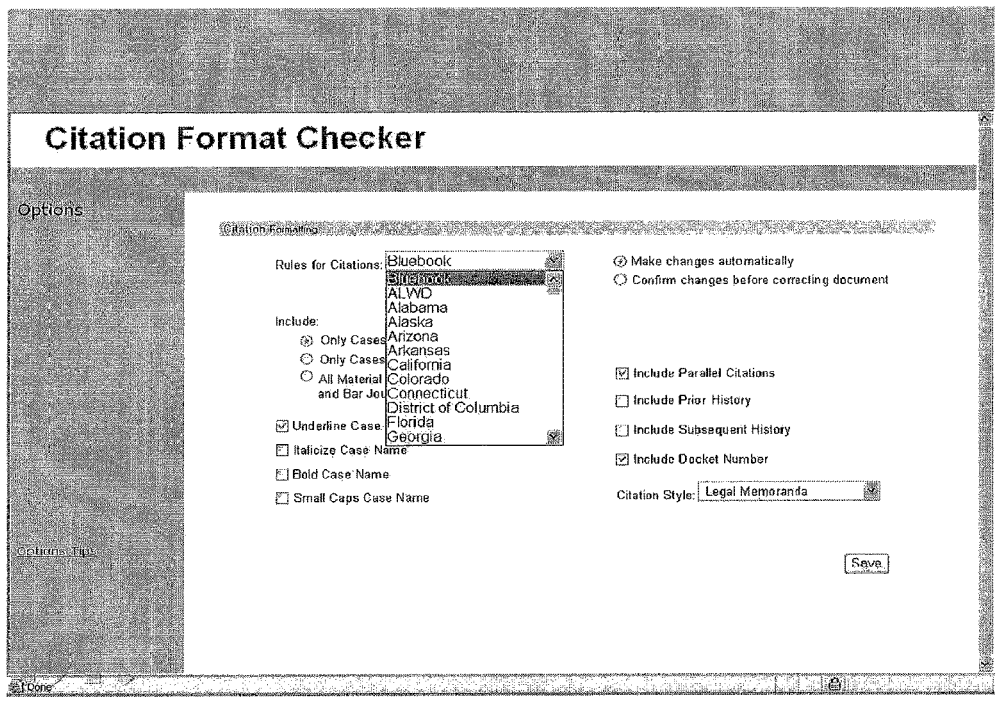
FIG. 5 is a facsimile of a graphical user interface 500 which may be incorporated into system 100 and which corresponds to one or more embodiments of the invention.

FIG. 5 shows an exemplary interface 500 which may be incorporated into interface 139 of System 100 and which allows a user to define certain aspects of how the citation-tools module 125 functions, particular in regards to the citation standard and actual textual format of the suggested citations.

FIGS. 6, 7, and 8 respectively show exemplary interfaces 600, 700, and 800 that provide alternative access points to the functionality of citation-tools module 125. Interface 600, a portion of an interface for an online legal research system, includes a variety of link lists, with a list 610 including links that are selectable to initiate one or more portions of citation-tools module 125. In FIG. 7, interface 700 provides access to the citation-tools module via a tab-style interface 710.

FIG. 8 shows interface 800, which allows direct-web access to the citations-tools functionality via a browser. In this interface, the user simply identifies the filename of a client side document using a filename entry field 810 and/or a browse selection feature 820 to select from a file directory stored on or accessible via access device 130. The user provides her personal access credentials (or credit card information) at input regions 830 and initiate citation checking or the building of table of authorities using command feature 840. Notable, in these cases, the users has the option of submitting an entire copy of document to server 120 and have the server returned a newly named modified version of the document with all suggested citations changes as well as a table of authorities.

FIG. 9 shows an interface 900 which may be incorporated into interface 139 and which allows a user to specify formatting options, such as options 910-980, for building a table of authorities. Option 910 allows a uses to select the location of the table. Option 920 allows the user to select the citation standard to use in the table. Option 930 allows the user to select the citation style, such as legal brief or legal memorandum. Option 940 allows the user to specify what types of citations to include in the table, such as only cases; only cases, statutes, and administrative codes; or all materials, which would include cases, statutes, administrative codes, law reviews, and bar journals and other cited material.

Option 950 allows the users to select case-name font options, such as underlining, italicizing, bolding, and small caps. Option 960 allows users to define whether the table combines or separates state and federal categories. Option 970 allows a user to define table entries as one-line or two-line entries, with two-line entries automatically placing the case name on a separate line from the remainder of the citation (which may take more the one line), and one-line entries running the case name and remainder of the citation on the same line. Option 980 allows a user to define whether to include document numbers in the citations. And option 990 allows the user to save the selected options, for example to a preference storage area on the server. In some embodiments, the user may name the selected options for reuse later, enabling the user to in essence having a profile of multiple table of authority formats which can be selected by name from another table-of-authority menu.

The embodiments described above are intended only to illustrate and teach one or more ways of practicing or implementing the present invention, not to restrict its breadth or scope. The actual scope of the invention, which embraces all ways of practicing or implementing the teachings of the invention, is defined only by the issued claims and their equivalents.

What is claimed is:

1. A citation formatting system associated with facilitating legal research, the system comprising:
   a database including a plurality of law-related documents associated with legal research and an indexed citation data structure comprising a document identifier and one or more secondary legal citations associated with at least one of the law related documents in the database, the document identifier further associated with the one or more secondary legal citations, the secondary legal citations formatted according to a citation standard, the citation standard being based on one or more of a bluebook standard, ALWD standard, and a user citation format preference; and
   a server coupled to the database and including a processor and a memory, said memory storing instructions that in response to a request to check a citation causes the processor to:
      retrieve a document citation using a citation-finder module, from a word-processing document of a client access device, the retrieved document citation associated with a specific law-related document;
      parse, by a citation formatter module, the retrieved document citation into one or more constituent citation components;
      determine using the constituent citation components, by the citation formatter module, whether the specific law-related document matches an existing law-related document in the database;
      transmit based on the determination, an error message to the client access device when the specific law related document does not match the existing law-related document in the database;
      identify using the indexed citation data structure at least one secondary legal citation from the matched existing law-related document in the database when the specific law related document matches the existing law-related document in the database; and
      transmit the identified secondary legal citation to a client access device for optional substitution in the word-processing document, the client access device including at least a word-processing interface region for editing the retrieved document citation.

2. The system of claim 1, wherein the identified secondary citation includes one or more parallel citations for the available law-related document.

3. The system of claim 2, wherein the parallel citations are formatted according to jurisdictional selections that identify one or more state or local court jurisdictions.

4. The system of claim 1, wherein the identified secondary legal citation includes a first citation referencing the available law-related document, a second citation referencing an available law-related document that is historically related to the available law-related document, and one or more indicators indicating whether or how legal reasoning in the available law-related document has been treated by the historically related document.

5. The system of claim 1, wherein the identified secondary legal citation includes a first citation referencing the available law-related document and a second citation referencing a predecessor available law-related document related to the available law-related document.

6. The system of claim 1, wherein the server is further configured to substitute the retrieved document citation in the word-processing document with a selected secondary legal citation based on selection for substitution received from a user of the client access device.

7. The system of claim 6, wherein the server is further configured to:
   generate a table-of-authorities based on one or more secondary legal citation in the word-processing document; and
   insert the table-of-authorities into the word-processing document.

8. The system of claim 1, wherein the client access device substitutes the retrieved document citation in the word-processing document with a selected secondary legal citation based on selection for substitution by a user of the client access device.

9. The system of claim 8, wherein the server is further configured to:
   generate a table-of-authorities based on one or more secondary legal citation in the word-processing document; and
   insert the table-of-authorities into the word-processing document.

10. The system of claim 1, wherein the server is further configured to:
    match a law-related document available in the database to the retrieved document citation; and
    retrieve from the indexed citation data structure at least one secondary legal citation for the available law-related document.

11. The system of claim 1, wherein the server is further configured responsive to a determination that the specific law-related document represented by the retrieved citation does not exist in the database, retrieving additional information from the word-processing document to make a determination whether the specific law-related document represented by the retrieved citation that does not exist in the database due to a database error, or due to an error in the retrieved document citation; and transmitting to the client device the result of the determination whether the specific law-related document represented by the retrieved document citation that does not exist in the database due to a database error, or due to an error in the retrieved citation.

12. A method of formatting citations associated with facilitating legal research, the method comprising:

retrieving a document citation using a citation-finder module of a server, from a word-processing document of a client access device, the retrieved document citation associated with a specific law-related document;

parsing by a citation-identifier module of the server, at least a portion of the formatted retrieved document citation into one or more constituent citation components;

determining using the constituent citation components, by a citation formatter module of the server, whether the specific law-related document matches an existing law-related document in a database, the database including a plurality of law-related documents associated with legal research and an indexed citation data structure comprising a document identifier and one or more secondary legal citations associated with at least one of the law related documents in the database, the document identifier further associated with the one or more secondary legal citations, the secondary legal citations formatted according to a citation standard, the citation standard being based on one or more of a bluebook standard, ALWD standard, and a user citation format preference;

transmitting based on the determination, an error message to the client access device when the specific law-related document does not match the existing law-related document in the database;

identifying using the indexed citation data structure, at least one secondary legal citation from the matched existing law-related document in the database, when the specific law-related document matches the existing law-related document in the database; and transmitting the identified secondary legal citation to a client access device for optional substitution in the word-processing document, the client access device including at least a word-processing interface region for editing the retrieved document citation.

13. The method of claim 12, wherein the method further comprises substituting the document citation in the word-processing document with the identified secondary legal citation based on selection for substitution received from a user of the client access device.

14. The method of claim 12, wherein the method further comprises:

generating a table-of-authorities based on one or more secondary legal citations in the word-processing document; and inserting the table-of-authorities into the word-processing document.

15. The method of claim 12, wherein identifying at least one secondary legal citation-comprises:

matching a law-related document available in the database to the retrieved document citation; and retrieving from the data structure at least one secondary legal citation for the available law-related document.

16. The method of formatting citations according to claim 12, further comprising responsive to a determination that the specific law-related document represented by the retrieved document citation does not exist in the database, retrieving additional information from the word-processing document to make a determination whether the specific law-related document represented by the retrieved document citation that does not exist in the database due to a database error, or due to an error in the retrieved citation; and for transmitting to the client device the result of the determination whether the specific law-related document represented by the retrieved document citation that does not exist in the database due to a database error, or due to an error in the retrieved citation.

\* \* \* \* \*